Patented May 31, 1949

2,471,889

UNITED STATES PATENT OFFICE 2,471,889

RUST PREVENTIVE COMPOSITIONS

Miriam A. Paliwoda, Bayonne, and Gordon W. Duncan, Westfield, N. J., assignors to Standard Oil Development Company, a corporation of Delaware No Drawing. Application February 24, 1947, Serial No. 730,554

6 Claims. (Cl. 106—14)

The present invention pertains to anti-corrosion compositions for ferrous metals and particularly to fluid homogenous rust preventing compositions which contain a volatile hydrocarbon solvent and a waxy material which is effective to provide a protective coating on metal parts after evaporation of the solvent.

The corrosion of metal which results from chemical and electrochemical reactions between metal and its surroundings is the source of great economic loss. Although moisture and dissolved oxygen are commonly involved in reactions which result in corrosion of metal, particularly in the rusting of ferrous metal, acids and salts coming in contact with metallic surfaces may catalyze rusting. By coating metallic surfaces with a film which is impervious to moisture or is capable of absorbing moisture and thus preventing its contact with the metal surface, active corrosion of ferrous metals may be prevented. It has been customary in the past to coat metallic objects with various paints, tars, grease compositions and the like to protect such surfaces from corrosion due to atmospheric moisture, ocean spray, finger prints and other sources of damage. It is obviously desirable that a protective film be sufficiently firm and adherent as to resist accidental removal while at the same time it is frequently essential that it be possible to completely remove the protective coating, when desired, without great expenditure of effort. Thus, various paints which are quite satisfactory in giving protection against rust are often quite undesirable for rust preventive purposes because they are difficult to remove when removal is required. On the other hand, some of the greases which are relatively easy to remove may not afford sufficient protection and furthermore their greasy characteristics are objectionable when frequent handling is required. In many situations if greasy protective coatings are used it is necessary to provide additional wrappings to cover up the grease, thus rendering the whole protective process quite expensive and inconvenient.

We have discovered that rust preventive compositions of excellent quality can be prepared by incorporating in volatile solvent solutions certain waxy materials which, when the volatile solvent evaporates, provide a thin adherent protective coating which is not easily removed by ordinary handling but can quickly be taken off by the use of an appropriate commonly available solvent when desired.

Accordingly it is an object of our invention to protect the surface of various articles, particularly those made of ferrous metals, by the use of a suitable waxy or resinous material which can be readily applied in solution, which becomes relatively dry and clean to handle, and which can be conveniently removed when desired.

It is a further object of our invention to employ certain synthetic waxes which are readily available and which are soluble to a good degree in common hydrocarbon and halogenated hydrocarbon solvents.

We have found that the waxes which are ordinarily used in coating compounds are only slightly soluble in most solvents at ordinary temperatures and are therefore not entirely suitable for the objects mentioned hereinabove. For example, some of the hydrocarbon waxes (paraffins and petrolatums), natural ester waxes and hard fats are soluble in petroleum naphthas to the extent of only about 0.1% up to perhaps 5% at room temperatures. While many of these waxes are useful in rust preventing compositions, their low degree of solubility makes them unsuitable for application as solutions and their compositions must be applied by swabbing or hot dipping.

We have discovered that certain waxes prepared by the esterification of polyhydroxy alcohols, such as pentaerythritol, have solubilities of 10% or more, commonly 10 to 25% at ordinary temperatures. At the same time these latter waxes possess melting points which are well above ambient temperatures commonly encountered, for example melting points of as much as 50° C. (122° F.) or more. It is obviously desirable that a coating composition for rust preventing or inhibiting purposes possess a relatively high melting point to minimize draining away of the coating during storage of coated articles at high ambient temperatures.

We have found that most satisfactory ester waxes for the purposes described above can be prepared by esterifying pentaerythritol with one molecular equivalent of a saturated fatty acid having from 12 to 22 or more carbon atoms and three molecular equivalents of a short chain carboxylic acid. Typical of the long chain fatty acids are myristic, palmitic, stearic, and hydrogenated acids of the type derived from fish oils. Acetic acid is a suitable short chain acid, although propionic and formic also may be used. The ester waxes prepared in this manner have surprisingly good solubilities in hydrocarbon solvents. While the mono-, di-, tri-, and tetra-stearates of pentaerythritol have very poor solubilities (1% to about 2.5% at room temperature in aromatic solvents), improvement results when the stearate radicals of the tetra-stearate are progressively replaced with acetic acid radicals up to the replacement of three stearates, where a solubility of 25% at ordinary temperatures in the same solvents is obtained. On the other hand, pentaerythritol-tetra-acetate has very poor solubility. Therefore the mono-stearate tri-acetate of pentaerythritol in particular is considered to be most unusual in its properties and we have found it to be an excellent ingredient for the preparation of rust protective coatings.

Softer, grease-like materials may be obtained by esterifying the polyhydroxy alcohol with mixed saturated and unsaturated fatty acids, such as a mixture of stearic and oleic acids, but the solubility-hardness-melting point relationship of these materials is inferior to those obtained as described above.

In lieu of pentaerythritol, other polyhydroxy alcohols such as tri methylol propane, poly pentaerythritol, and sorbitan or similar partially dehydrated hexols and pentols may be employed in the preparation of suitable waxy esters.

Waxes of the foregoing character which are suitable are those which have a melting point of at least 110° F. and preferably 120° F. or more. They should have a relatively high solubility in solvents such as naphthas, halogenated hydrocarbons and the like, a solubility of at least 10% by weight being desirable.

The ester waxes of this invention are relatively hard and a film of wax deposited from a volatile solvent is too brittle to be employed successfully in many instances. It is therefore normally desirable to employ a non-volatile material or materials in the composition in order to plasticize the ester wax coating. Suitable materials are the semi-solid fats such as refined wool grease (neutral degras) or viscous mineral oils or pitches. We have also discovered that the ester waxes have the ability to increase greatly the solubility of hydrocarbon waxes (paraffin waxes and petrolatum or micro-crystalline waxes) in organic solvents, and such waxes may be profitably employed, in combination with ester waxes as described above, in our composition. The composition may also include minor amounts of active rust inhibiting agents such as metallic sulfonates, carboxylates, and phenates, hydroxy esters of unsaturated or cyclic carboxylic acids, dibasic acids, phosphorus acid derivatives, sulfur compounds, amines, oxygenated solvents, wetting and emulsifying agents, resins, linear polymer thickeners, and the like.

The proportions of the major ingredients may be varied considerably. Thus the solvents, preferably aromatic or paraffinic solvent naphthas, having a flash point of 90° to 110° or 120° F., preferably about 100° F., may comprise from 50% to 90 or 95%, of the coating composition. Generally the solvent will run between 60 and 80%. The non-volatile components, consisting of esterified polyhydric alcohols and plasticizers will comprise most of the remainder. The ester, which is a long and short chain ester, formed by esterifying the alcohol with one molecular part of the long chain saturated fatty acid and three molecular parts of the short chain saturated carboxylic acid, comprises from 5 to 20% of the composition. The remainder, about 5 to 30% except for minor constituents comprising only one or two percent, is preferably a plasticizer of the type referred to above. The polyhydric alcohol may be any suitable alcohol having from 2 to 6 or more carbon atoms, pentaerythritol being preferred. The long chain saturated acid may contain from 12 to 22 carbon atoms or more, stearic acid being preferred. The short chain acid is preferably acetic acid but may be formic, propionic, or even butyric acid, the last mentioned being less suitable, apparently.

The composition of the invention may be prepared by using 50 to 95% of a volatile aliphatic or aromatic or mixed hydrocarbon solvent and 5 to 50% of non-volatile components of the type described above. Although halogenated solvents may also be used, they are generally not satisfactory because of corrosive tendencies. Commonly, a suitable composition consists of 70 to 85% of a petroleum naphtha, preferably having a boiling range between 300° and 410° F. The wax composition, or the ester wax and fat, paraffin wax, oil, or other material, may comprise substantially the remainder. It is desirable that the residue after the solvent has been evaporated have a firm and relatively hard surface. Hence, the degras or other non-waxy material should normally not exceed the amount of the ester wax and preferably is somewhat less than the ester wax composition in quantity.

The following specific examples were tested to determine the protection afforded by them to steel panels for a period in excess of 200 hours in a humidity cabinet in which moisture condensing conditions were maintained at a temperature of 100° F.:

| Ingredient | Wt. Per Cent Compositions | | |
|---|---|---|---|
| | 1 | 2 | 3 |
| Pentaerythritol mono stearate tri-acetate | Per Cent 15 | Per Cent 10 | Per Cent 10 |
| Neutral Wool Grease | 10 | 10 | |
| Butyl Cellosolve | 2 | | |
| Aromatic 100° F. Flash Point Naphtha | 73 | | |
| 200 Vis. c. 210° F. Coastal Oil | | 10 | 10 |
| Sorbitol mono oleate | | 1 | |
| Paraffinic 100° F. Flash Point Naphtha | | 69 | 70 |
| 165° F. M. P. Petrolatum | | | 10 |

All of the compositions given above were found to be entirely satisfactory, giving full protection for more than 200 hours. The conditions under which the tests were conducted are believed to be more severe than those which will commonly be encountered in practice. Composition No. 1 appeared to be slightly harder in finish than compositions No. 2, and No. 3, but all three were deemed to be quite suitable, permitting reasonable handling of the coated articles without undue displacement of the coating composition. The compositions were found to be readily removable by the use of a solvent such as petroleum naphtha or ordinary kerosene.

In general it appears that the rust preventive composition should contain a volatile hydrocarbon solvent which may be a paraffinic, naphthenic, aromatic, or mixed naphtha about 50% to 95% by weight, together with a non-volatile material 5% to 50% which comprises a major portion of a waxy ester. As indicated the latter should be soluble to the extent of at least 10% by weight in the solvent and preferably soluble up to 15 or 20%.

We claim:

1. A coating composition consisting essentially of 50 to 80% of a naphtha having a flash point of 90° to 110° F., 10 to 15% of pentaerythritol monostearate tri-acetate, and 10 to 20% of a non-volatile oily plasticizer.

2. A coating composition consisting essentially of 50 to 90% of an aromatic naphtha having a flash point of about 100° F., 5 to 20% of pentaerythritol mono-stearate tri-acetate, and 5 to 30% of a non-volatile oily plasticizer.

3. A rust preventive composition consisting essentially of a major proportion of volatile hydrocarbon having a flash point between 90° and 120° F., a plasticizer, and 5 to 25% of an ester of a polyhydric alcohol selected from the group which consists of pentaerythritol and polypentaerythritol, said ester containing one esterifying radical of a saturated fatty acid having from 12 to 22 carbon atoms and three radicals of saturated carboxylic acid having 1 to 4 carbon atoms.

4. A coating composition consisting essentially of 10 to 15% pentaerythritol mono-stearate tri-acetate, 10 to 20% of a plasticizer, 69 to 73% of a 100° F. flash point naphtha, and 0 to 2% of other solvent and plasticizing ingredients.

5. A composition consisting essentially of 10% pentaerythritol mono-stearate tri-acetate, 10% mineral oil of lubricating grade, 10% petrolatum of 135° to 170° F. melting point, and 70% paraffinic naphtha of 100° F. flash point.

6. A composition consisting essentially of 10% to 15% pentaerythritol mono-stearate tri-acetate, 10% neutral wool grease, 0 to 10% mineral oil of lubricating grade, and a naphtha solvent having a flash point of about 100° F.

MIRIAM A. PALIWODA.
GORDON W. DUNCAN.

REFERENCES CITED

The following references are of record in the file of this patent:

UNITED STATES PATENTS

| Number | Name | Date |
|---|---|---|
| 2,182,992 | Lebo | Dec. 12, 1939 |
| 2,306,315 | Lycan | Dec. 22, 1942 |
| 2,339,200 | Sowa | Jan. 11, 1944 |
| 2,371,333 | Johnston | Mar. 13, 1945 |
| 2,381,247 | Barth et al. | Aug. 7, 1945 |
| 2,390,202 | Burrell et al. | Dec. 4, 1945 |